US012792681B2

(12) United States Patent
Borden

(10) Patent No.: US 12,792,681 B2
(45) Date of Patent: *Nov. 10, 2026

(54) NAVIGATING AND INTERACTING WITH HIERARCHICAL LISTS

(71) Applicant: Procore Technologies, Inc., Carpinteria, CA (US)

(72) Inventor: Trevor Borden, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/004,027

(22) Filed: Dec. 27, 2024

(65) Prior Publication Data

US 2025/0225192 A1 Jul. 10, 2025

Related U.S. Application Data

(63) Continuation of application No. 18/487,834, filed on Oct. 16, 2023, now Pat. No. 12,216,725, which is a (Continued)

(51) Int. Cl.

*G06F 16/9538* (2019.01)
*G06F 16/2457* (2019.01)
*G06F 16/9535* (2019.01)

(52) U.S. Cl.

CPC .... *G06F 16/9538* (2019.01); *G06F 16/24578* (2019.01); *G06F 16/9535* (2019.01)

(58) Field of Classification Search

CPC ............. G06F 16/9538; G06F 16/9535; G06F 16/9536; G06F 16/24578; G06F 16/951

See application file for complete search history.

(56) References Cited

U.S. PATENT DOCUMENTS 6,370,538 B1 * 4/2002 Lamping ............... G06F 16/957 707/999.102
8,799,336 B1 8/2014 Burgess et al.
(Continued)

OTHER PUBLICATIONS

InstantSearch.js—DisjunctiveHierarchicalMenu—CodeSandbox, http://codesandbox.io/s/instantsearchjs-disjunctivehierarchicalmenu-zl3rm?file=/src/custom-disjunctive-facets.js, downloaded from the Internet Jul. 19, 2021, 1 page.

(Continued)

*Primary Examiner* — Kris E Mackes
(74) *Attorney, Agent, or Firm* — Lee Sullivan Shea & Smith LLP

(57) ABSTRACT

A computing platform that enables creation and management of data records may be configured to (i) cause a client station of a user to display an initial view of an interface for selecting, from a hierarchical list of possible values for a given data field of a data record, one or more values to assign to the given data field, (ii) receive, from the client station, a first indication that the user has selected a first value from the hierarchical list to assign to the given data field, and (iii) in response to receiving the first indication, (a) identify a second set of one or more values from a second level of the hierarchical list that are related to the first value, and (b) cause the client station to display an updated view of the interface in which the recommendation pane presents the second set of one or more values.

20 Claims, 9 Drawing Sheets

Related U.S. Application Data continuation of application No. 17/987,279, filed on Nov. 15, 2022, now Pat. No. 11,790,023, which is a continuation of application No. 17/234,243, filed on Apr. 19, 2021, now Pat. No. 11,500,955.

(56) References Cited

U.S. PATENT DOCUMENTS

| | | | | |
|---|---|---|---|---|
| 11,170,016 | B2 | 11/2021 | Das et al. | |
| 2005/0060647 | A1 | 3/2005 | Doan et al. | |
| 2012/0078885 | A1 | 3/2012 | Araya | |
| 2013/0124528 | A1 | 5/2013 | Gourdol et al. | |
| 2017/0102839 | A1* | 4/2017 | Nadella | G06Q 30/0641 |
| 2019/0034499 | A1 | 1/2019 | Das et al. | |
| 2020/0110795 | A1* | 4/2020 | Gupta | G06F 16/258 |

OTHER PUBLICATIONS

"Multi-Tier, Large Node (300+) Category Tree—Best Selector?" User Experience Stack Exchange, https://ux.stackexchange.com/questions/110267/multi-tier-large-node-300-category-tree-best-selector, downloaded from the Internet Jul. 19, 2021, 4 pages.

React Dropdown Tree Select—Code Sandbox, https://codesandbox.io/s/842m620yv0?file=/index.js, downloaded from the Internet Jul. 19, 2021, 1 page.

Storybook, https://instantsearchjs.netlify.app/stories/?path=/story/refinements-hirearchicalmenu--default, downloaded from the Internet Jul. 19, 2021, 1 page.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

NAVIGATING AND INTERACTING WITH HIERARCHICAL LISTS

CROSS-REFERENCE TO RELATED APPLICATIONS

This application is a continuation of, and claims the benefit of priority to, U.S. application Ser. No. 18/487,834, filed on Oct. 16, 2023, and titled "Computer System and Method for Navigating and Interacting with Hierarchical Lists," which is a continuation of U.S. application Ser. No. 17/987,279, filed on Nov. 15, 2022, issued as U.S. Pat. No. 11,790,023, and titled "Computer System and Method for Navigating and Interacting with Hierarchical Lists," which is a continuation of U.S. application Ser. No. 17/234,243, filed on Apr. 19, 2021, issued as U.S. Pat. No. 11,500,955, and titled "Computer System and Method for Navigating and Interacting with Hierarchical Lists," the contents of which are incorporated by reference herein in their entirety.

BACKGROUND

Software applications are used on a regular basis to perform and manage tasks in users' personal and professional capacities. As some examples, software applications may assist users with managing tasks related to email communications, customer relationship management, billing and payroll processing, human resources management, and construction management. Many other types of software applications exist.

Software applications handle a large volume of data and can be complex. It is therefore desirable for software applications to provide sophisticated features and tools which can enhance a user's ability to interact with the software application and the overall user experience. Thus, any tool that can improve a user's interaction with a software application is desired.

OVERVIEW

Software applications provide users with the capability to perform and/or manage various tasks related to a wide range of user needs. As such, software applications are relied upon heavily by users to manage tasks on a regular basis. Such tasks may relate to both personal and professional aspects and may range from routine tasks, such as managing a contact list, handling email communications, or tracking budget information, to more complex tasks such as managing patient information for a healthcare provider, managing employee payroll for a company, managing student enrollment for a university, or managing construction projects.

Many software applications provide the ability to perform and/or a manage a multitude of tasks and a combination of those tasks. For example, a human resources management software application may provide users with the ability to manage tasks related to human resources, such as managing an employee directory, updating employee information, and handling employee paycheck distribution, among other possibilities. As another example, a construction management software application (such as the one offered by Procore Technologies, Inc., who is the assignee of the present application) may provide users with the ability to manage tasks related to construction, such as creating new construction projects, uploading documentation (blueprints, contracts, etc.) related to a construction project, submitting and/or handling bids for various phases of a construction project, and managing invoices related to a construction project, among various other possibilities.

One action routinely performed while using a given software application is the creation of data records. A data record is typically a data structure that may take various forms, depending on the application. As one example, in a healthcare management platform, a data record may contain data related to a given patient. As another example, in a human resources management platform, a data record may contain data related to a given employee. As yet another example, in a construction management platform, a data record may contain data related to a given contractor. A data record may take other forms as well.

Further, a data record may be comprised of one or more data fields that each contain up to multiple values, depending on the application. As one example, in a healthcare management platform, a data record may contain a plurality of data fields that contain data for a given patient. For instance, such a data record may contain a data field for the patient's name, where the patient's name is the only value in the data field. The data record may also contain a data field for the patient's medical history, where the data field for the patient's medical history contains multiple values, one for each of the patient's former conditions and/or surgeries. Further, the data record may contain a data field for the patient's emergency contact phone number, which may not have a value if the patient has not provided one. Other examples exist as well.

Additionally, a value that is contained within a given data field may be assigned in various ways. As one example, the value may be assigned from an unconstrained universe of values. For instance, the value that populates a data field for a given patient's name may be any value since there is an unconstrained combination of letters (or numbers) that could conceivably make up a patient's name. As such, the value may be assigned through a user inputting the patient's name. As another example, the value may be from a predefined set of values. For instance, the value that populates a data field for a patient's age may be a value that can only be round numbers between 0 and 125, for example. The value may take other forms as well.

In some cases, the predefined set of values that can be assigned to a data field may take the form of a hierarchical list. A hierarchical list is a way to organize values in levels of varying granularity, where the top level contains values that are the least granular and each next lower level contains values that are more granular. Further, each value in the top level of the hierarchical list may have related, more granular, values in one or more lower levels of the hierarchical list. In this respect, each value in each lower level of the hierarchical list typically relates to one or more values in one or more higher levels of the hierarchical list.

One example of a hierarchical list of values that could be assigned to a data field could arise in the context of a retail storage management platform that includes data records indicating the available inventory for various retail stores. In that retail storage management platform, the respective data record for each retail store could include a "shoes" field that indicates the types of shoes that are offered for sale by the retail store, and the set of possible values that could be assigned to the "shoes" field of the retail store's data record could be represented in the form of a hierarchical list. In this example, the top level of the hierarchical list may include values for the broadest descriptions of possible shoes, such as "Heels," "Sneakers," and "Dress Shoes." A second level of the hierarchical list may correspond to more granular versions of the values relating to the values in the top level.

For instance, the second level may include values such as "Stilettos" and "Wedges" that are related to the "Heels" value in the top level of the list, "Casual" and "Athletic" that are related to the "Sneakers" value in the top level of the list, and values such as "Oxford" and "Wingtip" that are related to the "Dress Shoes" value in the top level of the list. Further, a third level of the hierarchical list may include even more granular versions of the values that are in the second level of the list. It should be understood that values may be related to one another insofar that they are considered to be more or less granular versions of one another. In this respect, some of the values in each of the hierarchical list may have one or more related values in different levels of the hierarchical list or might not have any related values.

Another example of a hierarchical list of values that could be assigned to a data field could arise in the context of a construction management platform that includes data records of construction professionals using the platform. In that construction management platform, the respective data record for each construction professional could include a "specializations" field that indicates the types of labor the construction professional may perform, and the set of possible values that could be assigned to the "specializations" field of the construction professional's data record could be represented in the form of a hierarchical list. Such a hierarchical list can become large and complex, including thousands of values across multiple levels. One example of such a hierarchical list is the Construction Specification Institute's MASTERFORMAT®, which provides uniform categories of labor that may be performed on a construction project.

While hierarchical lists are an effective way to represent a set of values, such as the set of possible values that can be assigned to a data field of a data record, they can be difficult for a user to navigate and interact with when displayed in a graphical user interface ("GUI"). In this respect, there is existing technology in other contexts that enables a user to navigate through and/or interact with a hierarchical list to some extent, but that existing technology is not well suited to navigating and interacting with hierarchical lists for purposes of assigning values to a data field of a data record. For instance, these existing technologies typically present hierarchical lists in the form of collapsible sub-lists of values where a user can expand each top-level data value to show more granular versions of the top-level data values.

One example of this existing technology arises in online shopping. For instance, in this example, a user may be presented with a GUI that displays a list of top-level values that are broad types of products, such as "Appliances," "Clothing," and "Electronics." The user may then select "Appliances" in the list, which in turn causes the GUI to expand the "Appliances" value and display all of the values related to "Appliances" in the next level down of the hierarchical list. For instance, the displayed values in the next level down may be values such as "Refrigerators," "Stoves," and "Dishwashers." The user may continue to select one or more of these values and in turn cause the GUI to display more and more granular values until the user has found the product for which he or she is looking. In this respect, a user may be unable to select the less granular versions of the data labels as they are not associated with specific products. To that end, this example of existing technology facilitates the searching and selection of only the most granular version of a particular value.

Another example of this existing technology arises in human resources management. For instance, in this example, a user may be presented with a GUI that displays a list of top-level values that are broad types of jobs available at a particular company, such as "Civil Engineer," "Media Manager," and "Senior Editor." The user may then select "Civil Engineer" in the list, which in turn causes the GUI to select all of the values related to "Civil Engineer" in each of the lower levels of the hierarchical list. In this respect, it may be assumed that a user wishes to broadly select all related values when selecting a top-level value.

While this existing technology may be beneficial for the applications described above, it is not well-suited to navigate through, and interact with, a hierarchical list for purposes of selecting values to assign to a data field of a data record. This is particularly the case as the size of the hierarchical list increases, both in terms of the levels of the list as well as the number of values stored in each level of the list, as these make it more difficult for the user to navigate and interact with the hierarchical list for purposes of assigning one or more values to the data field. For instance, as discussed above, one example of a hierarchical list of possible values for a data field could take the form of a large, complex hierarchy of categories of labor for a construction project, such as Construction Specification Institute's MASTERFORMAT® list that includes 50 values in the top level of the hierarchical list alone and more than a thousand values in total. It would be very difficult to navigate and interact with such a large, complex hierarchical list for purposes of assigning one or more values to the data field by using existing technology. For instance, selecting a value in a higher level of the list may cause the auto-selection of tens or hundreds of lower-level values related to the selected value. In turn, this could require the user to unselect all unwanted values, which can be a tedious and burdensome process if the user desired to only select a handful of lower-level values.

To address these and other problems with existing technology, disclosed herein is new software technology that facilitates user navigation of, and interaction with, a hierarchical list of possible values for a data field of a data record. The disclosed technology may be incorporated into any software application that facilitates the creation and management of data records that include data fields that can be populated with one or more values that are selected from a set of predefined values that are arranged in a hierarchical list. Some examples of which may include the types of software applications discussed above (e.g., Procore Technologies' software application for management that facilitates creation of data profiles for participating construction professionals), as well as other types of software applications (e.g., software applications for creating and managing human resources profiles, creating and managing time entries, expense reports, etc.), among other possibilities.

Further, in practice, the software application in which the disclosed technology is incorporated could either take the form of either (i) a software as a service ("SaaS") application that comprises a front-end software component running on a user's client station and a back-end software component running on a back-end platform that is accessible to the user client station via a communication network such as the Internet or (ii) a native application that runs on a user's client station, among other possibilities.

According to one example embodiment in which the disclosed technology has been incorporated into a SaaS application, when a user is accessing the SaaS application, the user may enter an input to create or update a given data field of a given data record.

In response to receiving the user's input, the back-end computing platform may cause the user's client station to present a GUI that displays an initial view through which the user may navigate and interact with a hierarchical list of possible values for a given data field of a given data record in order to add one or more values to the given data field of the given data record. The initial view may take various forms. As one possibility, the initial view may include (i) a search pane and (ii) a recommendation pane that includes an initial set of values.

The search pane may take various forms. As one example, the search pane may include a search dialogue through which the user can input a character string. In response to the user input, the search pane may be configured to search either all levels of a hierarchical list or a subset thereof, and display search results that include values that correspond to the character string. The search pane may take other forms as well.

The recommendation pane may take various forms as well. As one example, the recommendation pane may include an initial set of values. The values may be selectable by the user and may comprise either all of the values contained within the top level of the hierarchical list, or a subset thereof. Whether the recommendation pane includes all of the values or a subset of values from the top level of the hierarchical list may depend on various factors, including but not limited to the total number of values that exist within the top level of the hierarchical list. To illustrate with a specific example, the recommendation pane in the initial view could be configured to display a maximum of six values, but the top level of the hierarchical list may include ten values. In this scenario, the recommendation pane may display only six of the ten values.

In scenarios in which the recommendation pane displays a subset of values from the top level of the hierarchical list, the back-end computing platform may identify the subset of values to display in the recommendation pane in various ways. As one example, the back-end computing platform may identify the subset of values for display in the recommendation pane in alphabetical order. For instance, if the recommendation pane is to display only six of ten values from the top level of the hierarchical list, the back-end computing platform may sort the ten values in alphabetical order and then identify the first six values for display in the recommendation pane. As another example, the back-end computing platform may identify the subset of values for display in the recommendation pane based on values that are most likely to be chosen by the user. In this respect, the back-end computing platform may keep track of all top-level values that have historically been selected by other users and then identify the values that were selected most often for display in the recommendation pane in an effort to streamline the navigation of the user. In yet another example, the back-end computing platform may identify the subset of values for display in the recommendation pane based on the number of relatives of each top-level value. For instance, if six of the values have 20 relatives (e.g., 20 more granular versions of the value stored in lower levels of the hierarchical list) and four of the values only have 15 relatives, the back-end computing platform may identify the values with 20 relatives for display in the recommendation pane. The back-end computing platform may identify the subset of values to display in the recommendation pane in other ways as well.

It should be understood that while the above was described with respect to limiting the recommendation pane's display of values to a subset of values of the top level of the hierarchical list, if the recommendation pane is configured to display all of the values of the top level of the hierarchical list, the back-end computing platform may implement one or all of the above methods to display the values in the recommendation pane. For instance, if the recommendation pane is configured to display all of the values in the top level of the hierarchical list, the back-end computing platform may cause the user's client station to display the values in the recommendation pane in alphabetical order, in order of most popular (e.g., selected most by other users), or in order of number of relatives, among other ways.

It should further be understood that the recommendation pane is described above in relation to an initial view presented by the disclosed technology, and the recommendation pane may change in response to user input. For instance, the recommendation pane may display a first set of values in the top level of the hierarchical list in the initial view, but in response to user input, may display a second set of values in a different level of the hierarchical list. This interaction is described in further detail below.

The recommendation pane and initial view may take other forms as well.

Once the user's client station presents the initial view to the user via the GUI, the user may provide one or more inputs to select a value to assign to the given data field of the given data record. The user may provide the one or more inputs in various ways. As one possibility, the user may provide an input through selecting one of the values displayed in the recommendation pane. For instance, if the recommendation pane displays three values, such as "Bathroom," "Kitchen," and "Roofing," the user may select one of these three values to assign the value to the given field of the given data record. As another possibility, the user input may provide a first input to the search pane in the form of entering a character string. In response to receiving the character string, the search pane may display search results that contain values in the hierarchical list that match the character string. In this respect, the search results may include values from multiple levels of the hierarchical list (e.g., values of varying levels of granularity). For instance, if the character string is "Tile," the search results may include values that include "Tile," which would be a value included in the top level of the hierarchical list, "Bathroom Tile," which would be a value in a next, lower level of the hierarchical list, and "Bathroom Floor Tile," which would be a value in a next, even lower level of the hierarchical list. After viewing the search results displayed by the GUI, the user may select a value from the search results to assign the value to the given data field of the given data record. The user may provide input in other ways as well.

In response to receiving the user's selection, the back-end computing platform may (i) assign the selected value to the given data field of the given data record, and (ii) cause the user's client station to present an updated view within the GUI, where the updated view displays (a) an indication that the value has been selected by the user, and (b) an updated recommendation pane that includes values that are related to the selected value and stored in the next lower level of the hierarchical list. In this respect, the updated recommendation pane displays values that are more granular versions of the selected value. For instance, in a construction management platform example, if the user selected a value for "Tile" from the values displayed in the recommendation pane, the back-end computing platform may assign the value "Tile" to the given data field in the given data record and cause the user's client station to display an updated view of the GUI. The updated view of the GUI may include an updated recommendation pane that displays values from a next lower level of the hierarchical list that are more granular versions of the selected value "Tile." In this respect, the updated recommendation pane may display values such as "Bathroom Tile," "Subway Tile," and "Kitchen Tile," among others. Similar to the way the recommendation pane may display all or a subset of values in the top level hierarchical list in the initial view, the recommendation pane may also display all or a subset of values in the next lower level of the hierarchical list in the updated view as well.

Using the disclosed software technology described above, a user can continue to select values and in turn be presented with more granular versions of the selected values until the user has selected all of the desired values. In this respect, the disclosed technology allows the user to add values to a desired level of granularity. For instance, the user can select "Tile" from the top level of the hierarchical list, be presented with "Bathroom Tile" and "Kitchen Tile" from the next lowest level of the hierarchical list (i.e., the second-highest level), select "Bathroom Tile" from those options, and then be presented with "Penny Tile" and "Subway Tile" from the next lowest level of the hierarchical list (i.e., the third-highest level). The user may then determine that "Bathroom Tile" is the most granular value he or she would like to select, and then forgo selection of either "Penny Tile" or "Subway Tile." At this point, the user may decide to utilize the search pane to select additional values or the user may decide that he or she is finished assigning values to the given field of the given data record and thus decide to save the data record, which in turn may then cause the back-end computing platform to store the newly-created or updated data record.

As described above, the disclosed software technology improves a user's ability to drill down into lower, more granular levels of a hierarchical list in an efficient way. For certain data fields of a data record, drilling down to those lower levels can be important when trying to accurately represent a value. For instance, using the construction management platform example above to illustrate, a user may desire to create a data record for a construction professional that comprises a specializations data field that may be populated with one or more values that are selected from a predefined set of specializations arranged in a hierarchical list (e.g., the Construction Specification Institute's MASTERFORMAT® hierarchy of categories of labor). In this example, it may benefit the user to utilize the disclosed technology to drill down to lowest level of the hierarchical list to select the most granular version of a given value to assign to the data field because the most granular version is likely the most accurate value.

For instance, if a general contractor is looking to hire the construction professional, the general contractor may refer to the specializations data field of the data record associated with the construction professional. In this respect, if the general contractor is looking for construction professionals that specialize in "Bridge Demolition," but the specializations data field of the construction professional's data record only contains a value for "Demolition," then the general contractor might not hire the construction professional. However, had the construction professional utilized the disclosed software technology to drill down to lower levels of the list, the user could have added the "Bridge Demolition" value and subsequently been hired by the general contractor.

As such, the disclosed software technology improves upon existing technology by enabling a user to create and update data fields in a data record by streamlining the values of the hierarchical list that are presented to the user in a way that minimizes the number of values that the user must review to select and assign values to a given data field of a given data record. For instance, as discussed above, if the values that can be assigned to the given data field of the given data record take the form of the MASTERFORMAT®, the disclosed software technology may present the values in way that does not overwhelm the user while still allowing the user to select the most accurate values to add to the given data field of the given data record.

Accordingly, in one aspect, disclosed herein is a method that involves a computing platform (i) causing a client station of a user to display an initial view of an interface for selecting, from a hierarchical list of possible values for a given data field of a data record, one or more values to assign to the given data field, where the initial view comprises (a) a search pane that enables the user to search for values within the hierarchical list, and (b) a recommendation pane that presents a first set of one or more values from a first level of the hierarchical list, (ii) while the client station is displaying the initial view of the interface, receiving, from the client station, a first indication that the user has selected a first value from the hierarchical list to assign to the given data field, where the first value comprises either (a) a value presented to the user via the search pane or (b) a given one of the first set of one or more values, (iii) in response to receiving the first indication, (a) assigning the first value to the given data field, (b) identifying a second set of one or more values from a second level of the hierarchical list that are related to the first value, and (c) causing the client station to display an updated view of the interface in which the recommendation pane presents the second set of one or more values, (iv) while the client station is displaying the updated view of the interface, receiving, from the client station, a second indication that the user has selected a second value from the hierarchical list to assign to the given data field, where the second value comprises a given one of the second set of one or more values, and (v) in response to receiving the second indication, assigning the second value to the given data field.

In some examples, the method further involves, in response to receiving the second indication, identifying a third set of one or more values from a third level of the hierarchical list that are related to the second value and cause the client station to display a further updated view of the interface in which the recommendation pane presents the third set of one or more values. In these examples, in the further updated view of the interface, the recommendation pane may additionally present an updated second set of one or more values that no longer includes the second value.

In other examples, the method further involves, (i) after receiving the second indication, determining that the second value does not have any related value from a third level of the hierarchical list; and (ii) in response to determining that the second value does not have any related value from the third level of the hierarchical list, causing the client station to display a further updated view of the interface in which the recommendation pane presents an updated second set of one or more values that no longer includes the second value.

In yet other examples, the method further involves (i) receiving a third indication that the user has requested to store the data record, and (ii) in response to receiving the third indication, storing the data record.

In still other examples, the first set of one or more values from the first level of the hierarchical list comprises less than of all of the values included in the first level of the hierarchical list.

In additional examples, the second set of one or more values from the second level of the hierarchical list comprises less than of all of the values included in the second level of the hierarchical list.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As discussed above, disclosed herein is software technology that facilitates the navigation of, and interaction with, hierarchical lists.

I. EXAMPLE NETWORK CONFIGURATION

As one possible implementation, this software technology may include both front-end client software running on one or more client stations that are accessible to client users of the software technology and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform (e.g., a native software application). The software technology disclosed herein may take other forms as well.

Figure 1:
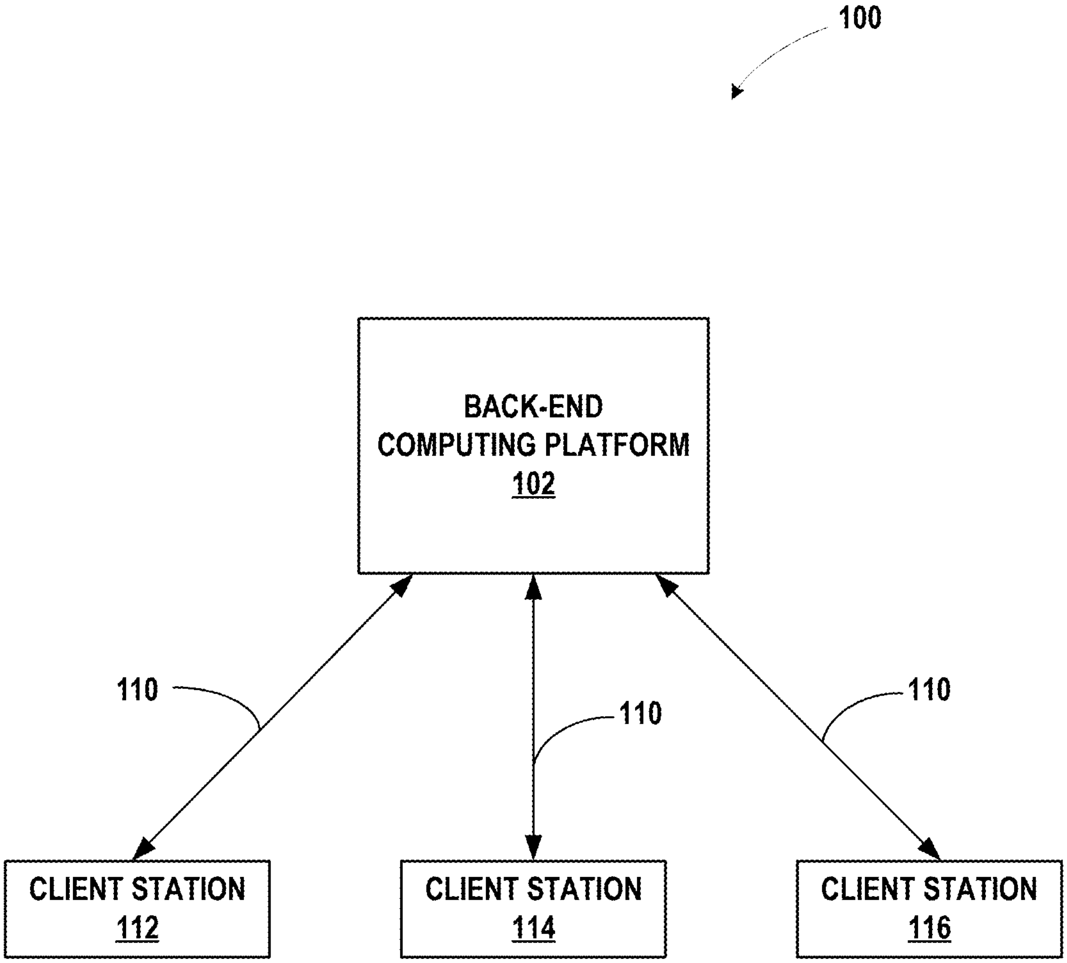
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein, including but not limited to functions related to outputting associated data and/or instructions that define the visual appearance of a front-end interface (e.g. a graphical user interface (GUI)) through which the data is to be presented on the one or more client stations, and updating data profiles with the list items selected using the disclosed software technology. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
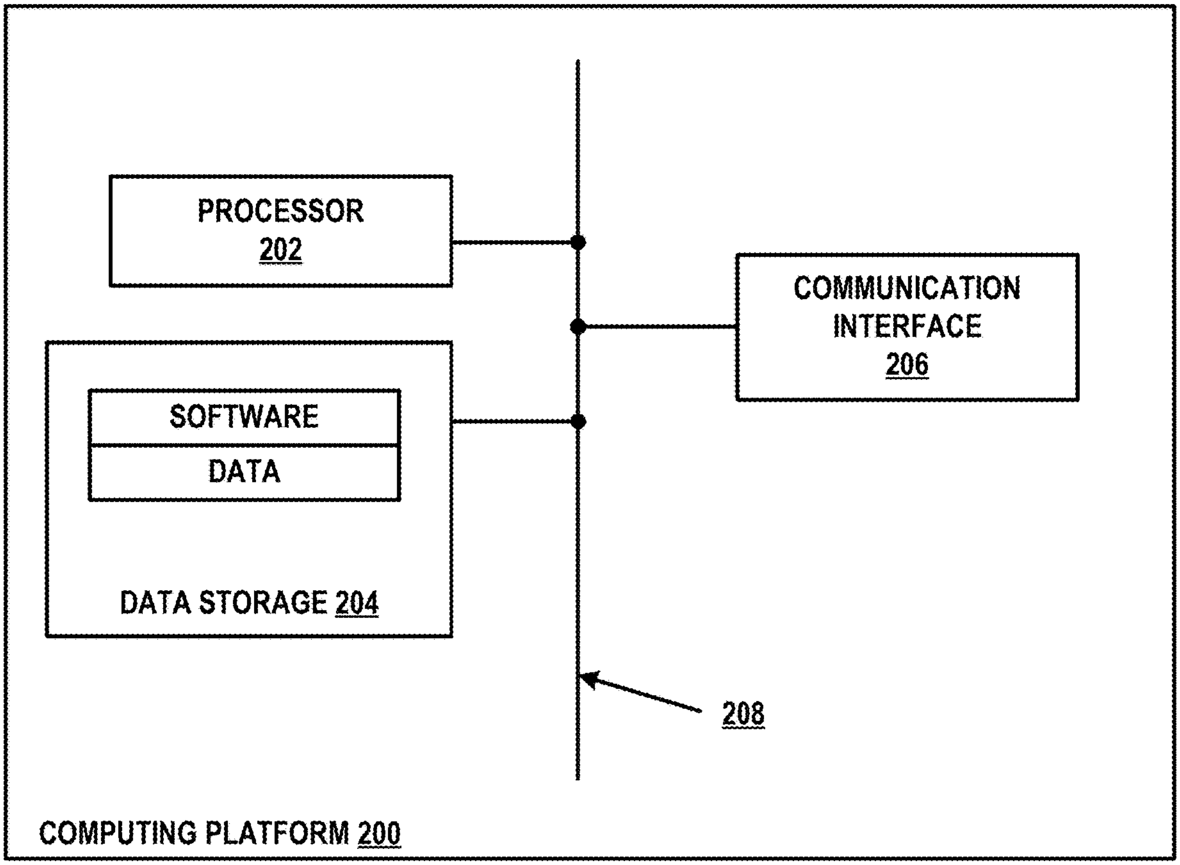
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that platform 200 is configured to perform some or all of the disclosed functions and (ii) data that may be received, derived, or otherwise stored, for example, in one or more databases, file systems, or the like, by platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication, among other possibilities. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE FUNCTIONALITY

As described above, the disclosed technology is generally directed to a new software technology that facilitates the navigation of, and interaction with, hierarchical lists and the selection of values that can subsequently be assigned to a given data field of a given data record. The disclosed technology may be incorporated into any software application that facilitates the creation and management of data records that include data fields that are populated with one or more values that are selected from a set of predefined values that are arranged in a hierarchical list.

The disclosed software technology may include various aspects and may take various forms. Some example functions for utilizing the disclosed software technology will now be described with reference to FIGS. 3A and 3B.

For the purposes of illustration only, the example functions are described as being carried out by a back-end computing platform (e.g., back-end computing platform 102), a client station (e.g., one of client stations 112, 114, or 116), and a user 301. Further, it should be understood that the flow diagram that begins in FIG. 3A and is continued in FIG. 3B is merely described in such a manner for the sake of clarity and explanation and that some functions may be carried out in various other manners as well, including the possibility that example functions may be added, removed, rearranged into different orders, grouped together, and/or not grouped together at all.

In practice, the software application in which the software technology is incorporated could either take the form of either (i) a SaaS application that comprises a front-end software component running on a user's client station and a back-end software component running on a back-end platform that is accessible to the user client station via a communication network such as the Internet (e.g., directing a web browser on the user's client station to a uniform resource locator (URL) for the software application) or (ii) a native application that runs on a user's client station, among other possibilities.

According to one example embodiment in which the disclosed software technology has been incorporated into a SaaS application, back-end computing platform may, at block 302, maintain values in a hierarchical list that could be assigned to a given data field of a given data record. The hierarchical list may take various forms. As one possibility, the hierarchical list is a way to organize values in levels of varying granularity, where the top level contains values that are the least granular and each next lower level contains values that are more granular than values in the previous level. Further, each value in the top level of the hierarchical list may have related, more granular, values in one or more lower levels of the hierarchical list. In this respect, the each value in each lower level of the hierarchical list typically relates to one or more values in one or more higher levels of the hierarchical list. As an illustrative example, in a hierarchical list that contains values that can be assigned to a data field in a data record of a construction professional in a construction management platform, a lower-level value for "Subway Tile" may be related to multiple values in higher levels of the hierarchical list, such as values for "Kitchen Tile" and "Bathroom Tile." In this respect, the value "Subway Tile" is a more granular version of both "Kitchen Tile" and "Bathroom Tile." The hierarchical list may take other forms as well.

At block 304, a user may, while accessing a SaaS application that incorporates the disclosed software technology, submit a request to create or update a given data field of a given data record via client station 112. In this respect, the SaaS application may provide the user with a selectable element through which the user can submit the request. In turn, the user may submit the request by interacting with the selectable element.

At block 306, back-end computing platform 102 may receive the request to create or update the given data field of the given data record. Back-end computing platform 102 may receive the request in various ways. As one example, back-end computing platform may receive the request via a message from client station 112. Back-end computing platform 102 may receive the request in other ways as well.

At block 308, in response to receiving the user's request, back-end computing platform 102 may cause client station 112 to present a GUI that displays an initial view comprising (i) a search pane that enables the user to search for values within the hierarchical list, and (ii) a recommendation pane that presents a first set of one or more values from a first level of the hierarchical list.

The search pane may take various forms. As one example, the search pane may include a search dialogue through which the user can input a character string. The user may input the string of characters in various ways. The user may input the string of characters using a keyboard, a mouse or trackpad, a display screen, a touch-sensitive interface, a stylus, a virtual-reality headset, or through voice commands via a microphone. The user may input the string of characters in other ways as well. In response to the user input, the search pane may be configured to search either all levels of a hierarchical list or a subset thereof, and display search results that include values that correspond to the character string. The search pane may take other forms as well.

The recommendation pane may take various forms as well. As one example, the recommendation pane may include an initial set of values. The values may be selectable by the user and may comprise either all of the values contained within the top level of the hierarchical list, or a subset thereof. Whether the recommendation pane includes all of the values or a subset of values from the top level of the hierarchical list may depend on various factors, including but not limited to the total number of values that exist within the top level of the hierarchical list. To illustrate with a specific example, the recommendation pane in the initial view could be configured to display a maximum of six values, but the top level of the hierarchical list may include ten values. In this scenario, the recommendation pane may display only six of the ten values.

In scenarios in which the recommendation pane displays a subset of values from the top level of the hierarchical list, the back-end computing platform may identify the subset of values to display in the recommendation pane in various ways. As one example, the back-end computing platform may identify the subset of values for display in the recommendation pane in alphabetical order. For instance, if the recommendation pane is to display only six of ten values from the top level of the hierarchical list, the back-end computing platform may sort the ten values in alphabetical order and then identify the first six values for display in the recommendation pane. As another example, the back-end computing platform may identify the subset of values for display in the recommendation pane based on values that are most likely to be chosen by the user. In this respect, the back-end computing platform may keep track of all top-level values that have historically been selected by other users and then identify the values that were selected most often for display in the recommendation pane in an effort to streamline the navigation of the user. In yet another example, the back-end computing platform may identify the subset of values for display in the recommendation pane based on the number of relatives of each top-level value. For instance, if six of the values have 20 relatives (e.g., 20 more granular versions of the value stored in lower levels of the hierarchical list) and four of the values only have 15 relatives, the back-end computing platform may identify the values with 20 relatives for display in the recommendation pane. The back-end computing platform may identify the subset of values to display in the recommendation pane in other ways as well.

It should be understood that while the above was described with respect to limiting the recommendation pane's display of values to a subset of values of the top level of the hierarchical list, if the recommendation pane is configured to display all of the values of the top level of the hierarchical list, the back-end computing platform may implement one or all of the above methods to display the values in the recommendation pane. For instance, if the recommendation pane is configured to display all of the values in the top level of the hierarchical list, the back-end computing platform may cause the user's client station to display the values in the recommendation pane in alphabetical order, in order of most popular (e.g., selected most by other users), or in order of number of relatives, among other ways.

It should further be understood that the recommendation pane is described above in relation to an initial view presented by the disclosed technology, and the recommendation pane may change in response to user input. For instance, the recommendation pane may display a first set of values in the top level of the hierarchical list in the initial view, but in response to user input, may display a second set of values in a different level of the hierarchical list. This interaction is described in further detail below.

The recommendation pane and initial view may take other forms as well.

At block 310, client station 112 may present the GUI displaying the initial view comprising (i) the search pane that enables the user to search for values within the hierarchical list, and (ii) the recommendation pane that presents the first set of one or more values from the first level of the hierarchical list.

Figure 4A:
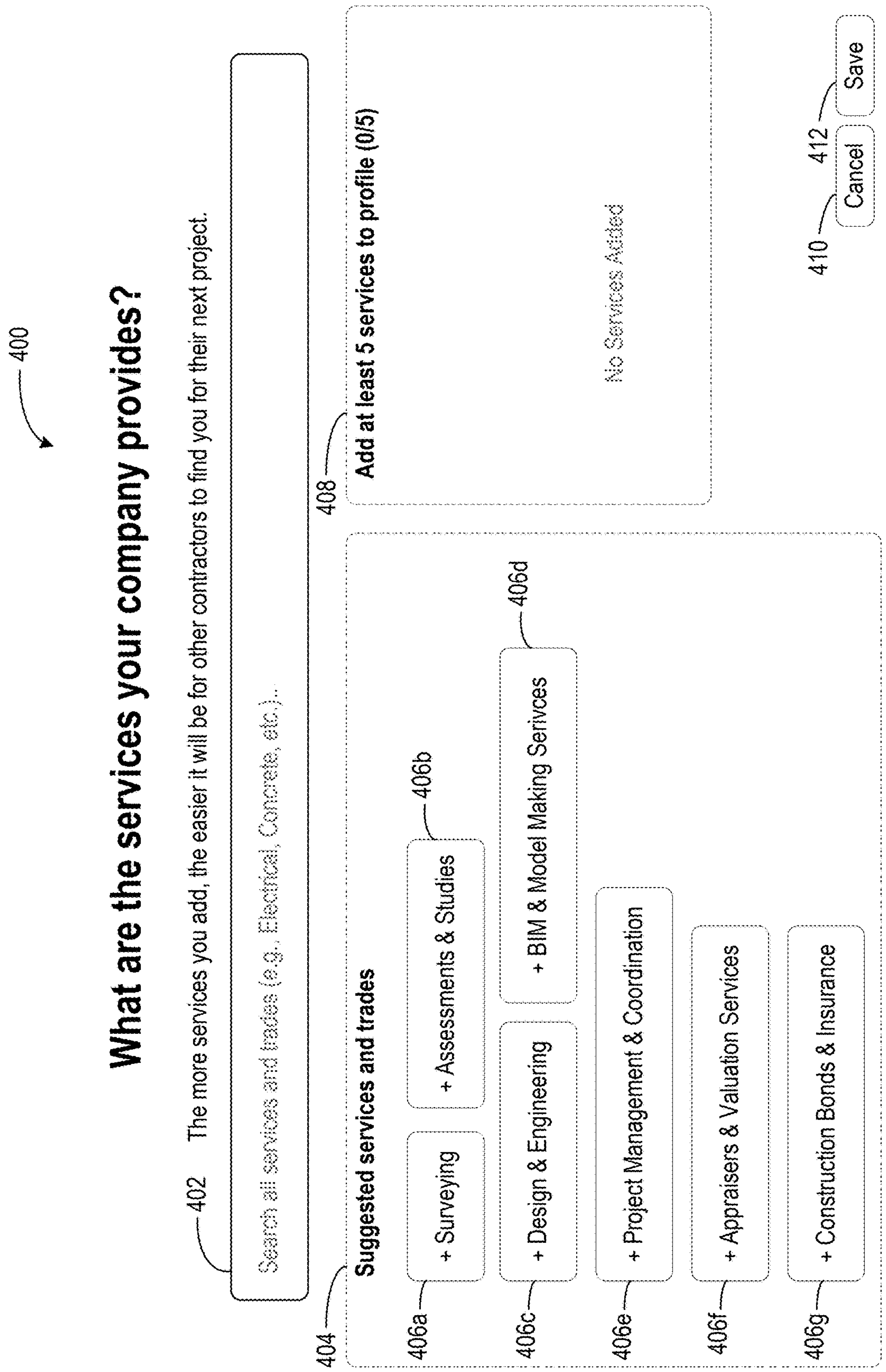
FIG. 4A depicts an example initial view of a GUI that may be presented to a user to navigate a hierarchical list and select values to be added to a data field of a data record using the disclosed software technology.

As one example to illustrate, FIG. 4A depicts an example initial view 400 that may be presented to a construction professional who desires to add one or more specializations to a data field of a data record within a software application (e.g., Procore Technologies' software application for construction management that facilitates creation and management of data profiles including construction professional profiles). As shown, example view 400 includes a search pane 402, a recommendation pane 404 that includes a first set of values 406*a*, 406*b*, 406*c*, 406*d*, 406*e*, 406*f*, and 406*g*, a profile pane 408, a selectable cancel element 410, and a selectable save element 412. Example view 400 may include various other elements that are contemplated but not shown.

Search pane 402 may take various forms. As one possibility, search pane 402 may be a search dialogue box that accepts a user input of a string of characters. The user may input the string of characters in various ways. The user may input the string of characters using a keyboard, a mouse or trackpad, a display screen, a touch-sensitive interface, a stylus, a virtual-reality headset, or through voice commands via a microphone. The user may input the string of characters in other ways as well. Search pane 402 may take other forms as well.

Further, as shown in FIG. 4A, search pane 402 may indicate to the user the purpose of search pane 402. For instance, as shown, search pane 402 includes the text "Search all services and trades (e.g., Electrical, Concrete, etc.)" to prompt the user as to the purpose of search pane 402.

Recommendation pane 404 may function to present a first set of selectable values to the user through which the user can assign a given value from the first set of selectable values to a data field in the data record. As discussed above, the selectable values that appear within recommendation pane 404 in the initial view of the GUI may represent all or a subset of the values contained within the top level of a hierarchical list. As shown, recommendation pane 404 includes values 406*a*, 406*b*, 406*c*, 406*d*, 406*e*, 406*f*, and 406*g*, each of which are values in the top level of the hierarchical list.

Profile pane 408 may take various forms and serve various functions. As one possibility, profile pane 408 may function to (i) display to the user the values that have previously been selected while accessing the disclosed software technology. Profile pane 408 may take other forms and serve various other functions as well.

Cancel element 410 may take various forms and serve various functions. As one possibility, cancel element 410 may function to erase all previously selected values from the data field in the data record. As another possibility, cancel element 410 may function to exit the software technology, which in turn ceases display of example view 400. Cancel element 410 may take other forms and serve various other functions as well.

Save element 410 may take various forms and serve various functions. As one possibility, save element 410 may function to cause back-end platform 102 to store all of the selected values assigned to the data field in the data record. As another possibility, save element 410 may function to cause back-end platform 102 to overwrite the values previously stored in the data field of the data record with all of the selected values assigned using the disclosed technology. Save element 412 may take other forms and serve various other functions as well.

Turning back to the construction professional example, the construction professional may desire to assign one or more specializations to a data field of the data record. In particular, the construction professional may specialize in finishing work and in turn may desire to add different types of finishing work to the data field of the data record. As a result, the construction professional may glance at example view 400 and determine that none of the selectable values 406*a*, 406*b*, 406*c*, 406*d*, 406*e*, 406*f*, and 406*g* displayed in recommendation pane 404 accurately describe any of the construction professional's specializations. As such, the construction professional may decide to use search pane 402 to search for values that correspond to finishing work in order to assign them to the data field of the data record.

Turning back to FIG. 3A, at block 312, the user may submit user input into the search pane to search the hierarchical list for desired values. The user may submit the user input in various ways. As one possibility, the user may provide, via a keyboard, a character string to the search pane. As another possibility, the user may provide a voice command that the user's client station converts into a character string. The user may submit the user input in other ways as well.

In response to receiving the user's input, client station 112 may, at block 314, display search results that include values that match the user's input.

Figure 4B:
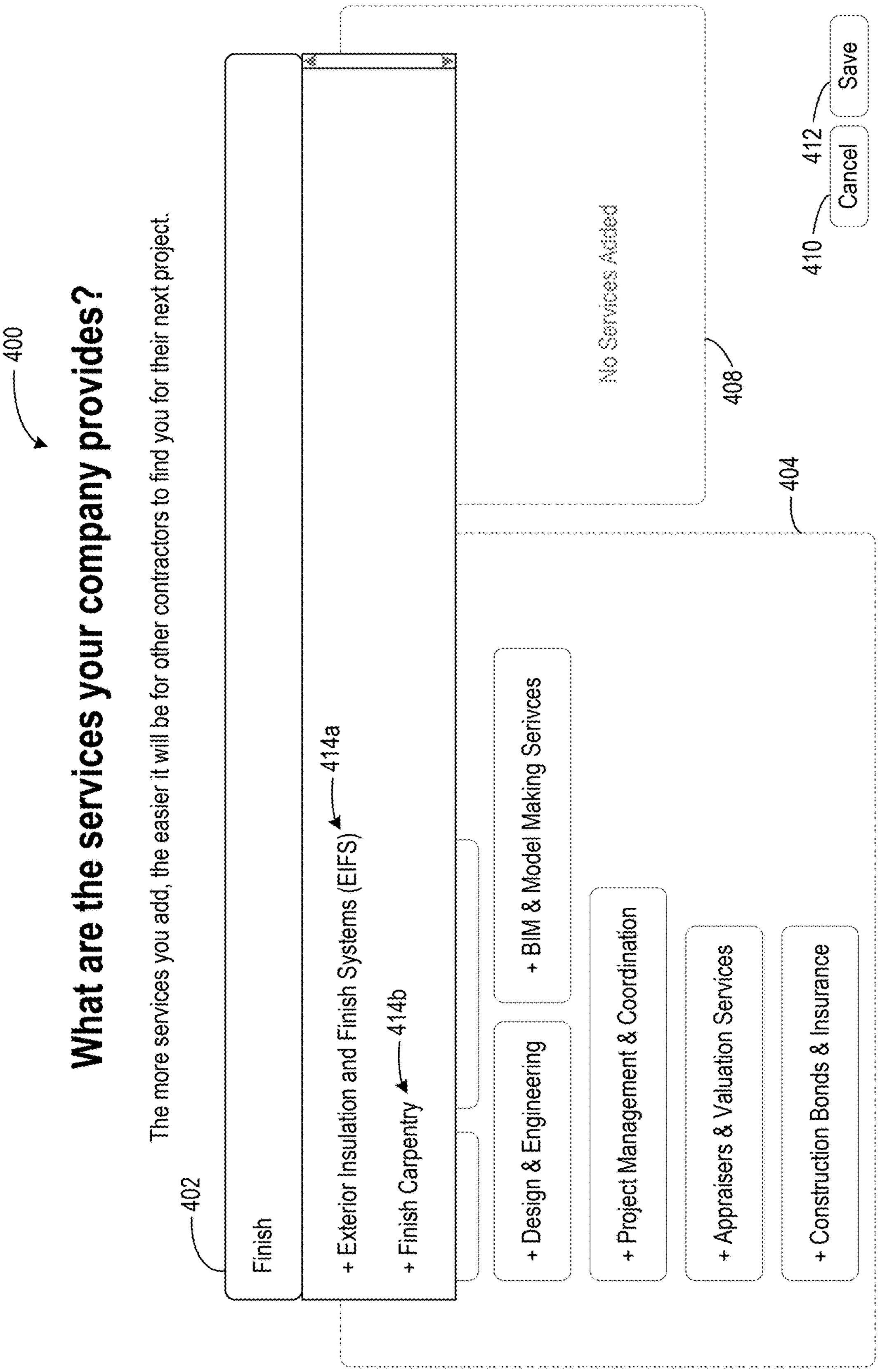
FIG. 4B depicts an example updated view of a GUI that may be presented to a user after a user interacts with a search pane using the disclosed software technology.

To illustrate using the construction professional example, FIG. 4B shows an updated example view 400 in which the user has entered the character string "Finish" into search pane 402. In response to the user's input, a drop-down menu is displayed that contains search results 414*a* and 414*b* that match the string "Finish." As shown, the search results displayed in search pane 402 contain values across multiple levels of the hierarchical list and thus represent values of varying granularity. In this respect, the user may be unaware that the search results are from different levels of the hierarchical list. This may be advantageous insofar that it presents the user with the most relevant values that match the character string, instead of values from just one level of the hierarchical list.

Returning to FIG. 3A, at block 316, the user may select a first value from the displayed search results. The user may select the first value in various ways. As one possibility, the user may click a value within the search results via a peripheral device such as a mouse, keyboard, stylus, and/or touch screen. As another possibility, the user may provide a voice command to select the value from the displayed search results. The user may select the first value in other ways as well.

In response to the user's selection, back-end computing platform 102 may, at block 318 assign the selected first value to the given data field of the given data record. This function may be performed in various ways. As one possibility, back-end platform 102 may store the selected first value in the given data field of the given data record. As another possibility, back-end platform 102 may designate the selected first value to be stored in the given data field of the given data record at a future time once the user has finished selecting all values. Back-end platform 102 may assign the selected first value to the given data field of the given data record in other ways as well.

Returning to FIG. 4B, the construction professional may, upon viewing the search results within search pane 402, select "Finish Carpentry," which is shown as search result 414*b*.

Figure 3A:
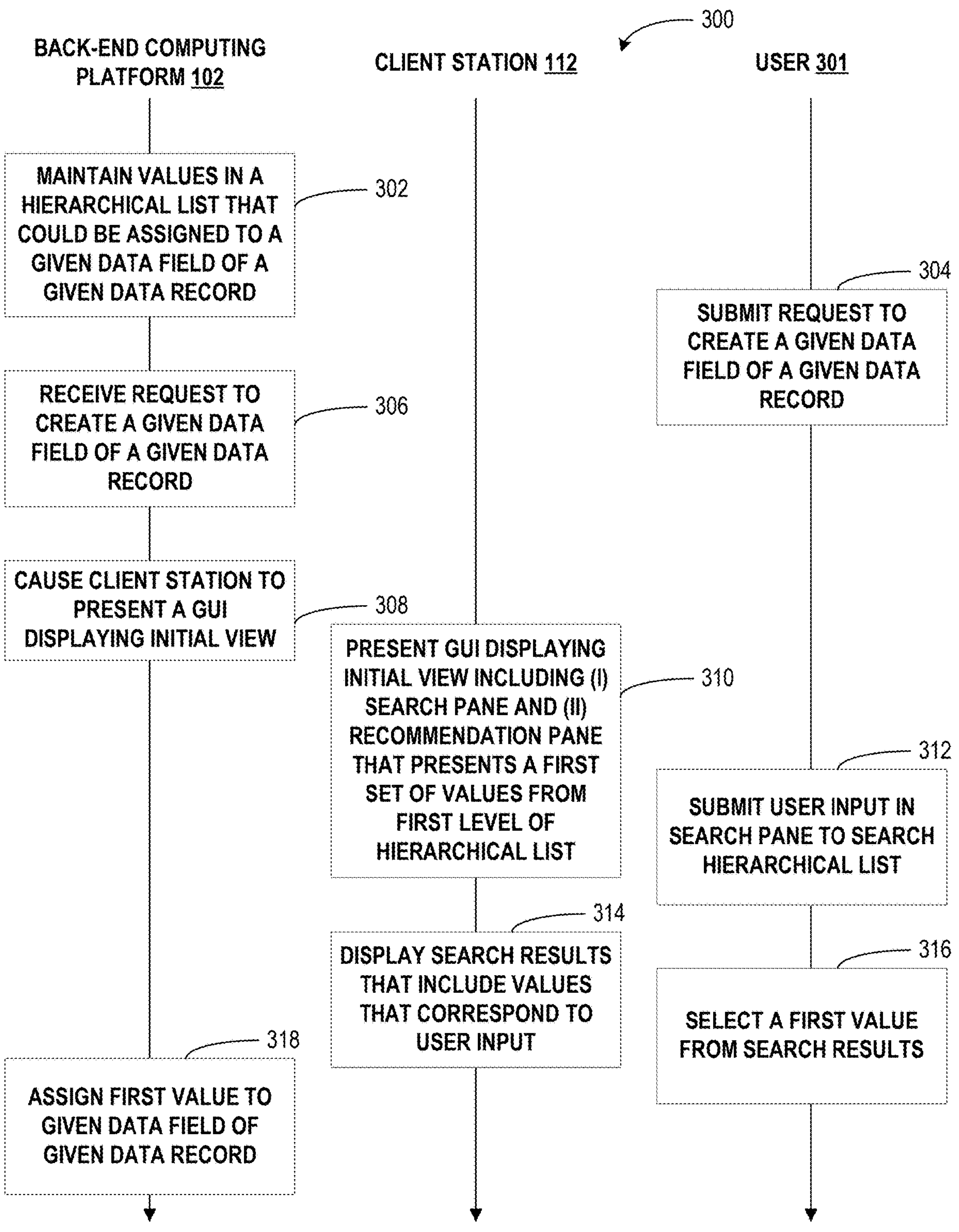
FIG. 3A depicts an example message flow diagram for navigating a hierarchical list and updating data records using the disclosed software technology.
Figure 3B:
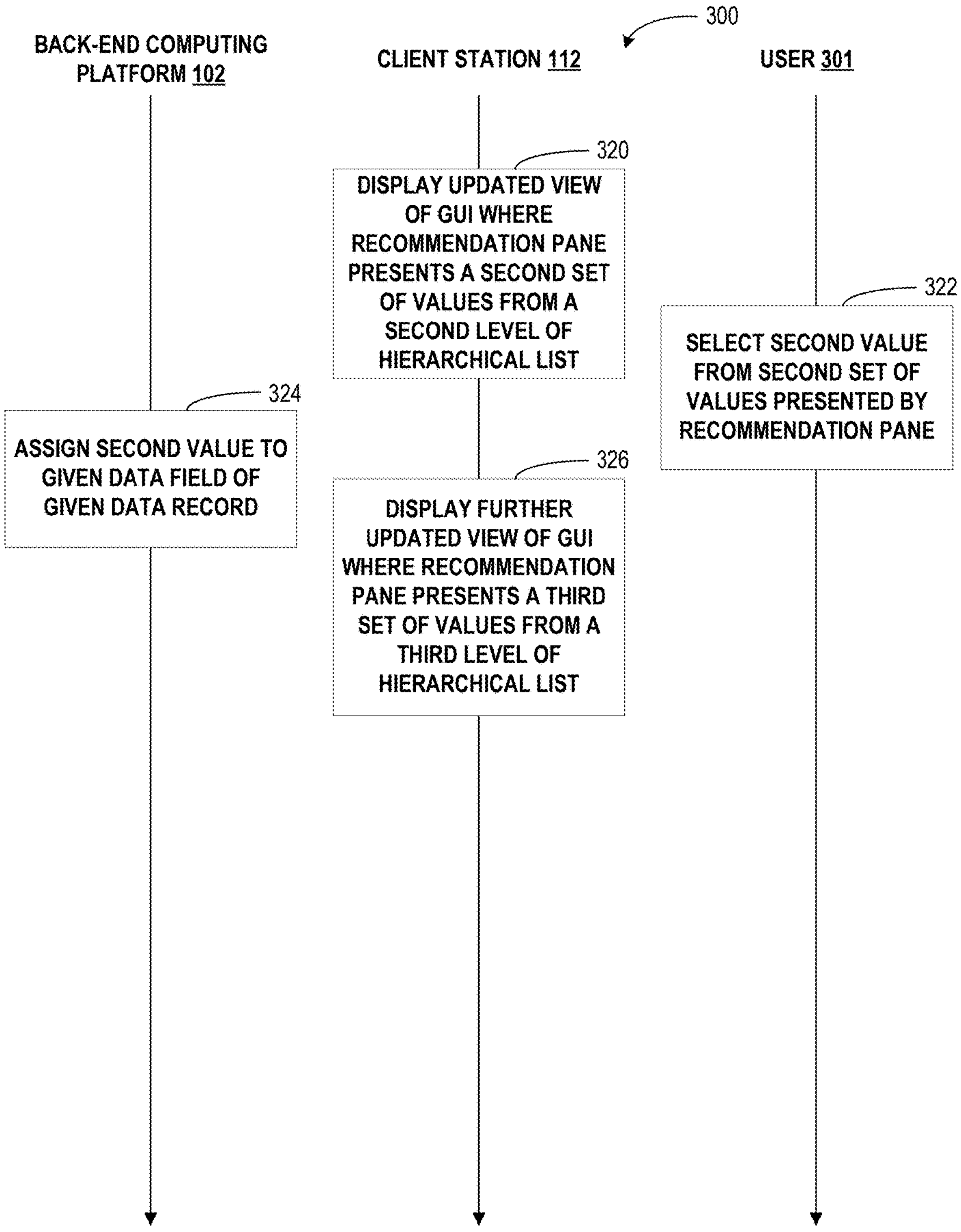
FIG. 3B depicts a continuation of the example message flow diagram for navigating a hierarchical list and updating data records using the disclosed software technology.

Turning to FIG. 3B, which shows a continuation of the software technology message flow shown in FIG. 3A, at block 320, client station 112, in response to receiving the user selection of the first value, may display an updated view of the GUI where the recommendation pane presents a second set of values from a second level of the hierarchical list. The second set of values may take various forms. In one example, the second set of values may be from a next lower level of the hierarchical list, where each value in the second set of values is a more granular version of the first value. However, in some scenarios, the first value may not have any related values in the next lower level of the hierarchical list. As such, in another example, the second set of values may be the same as the first set of values from which the first value was selected but with the first value removed from the set. The second set of values may take other forms as well.

Figure 4C:
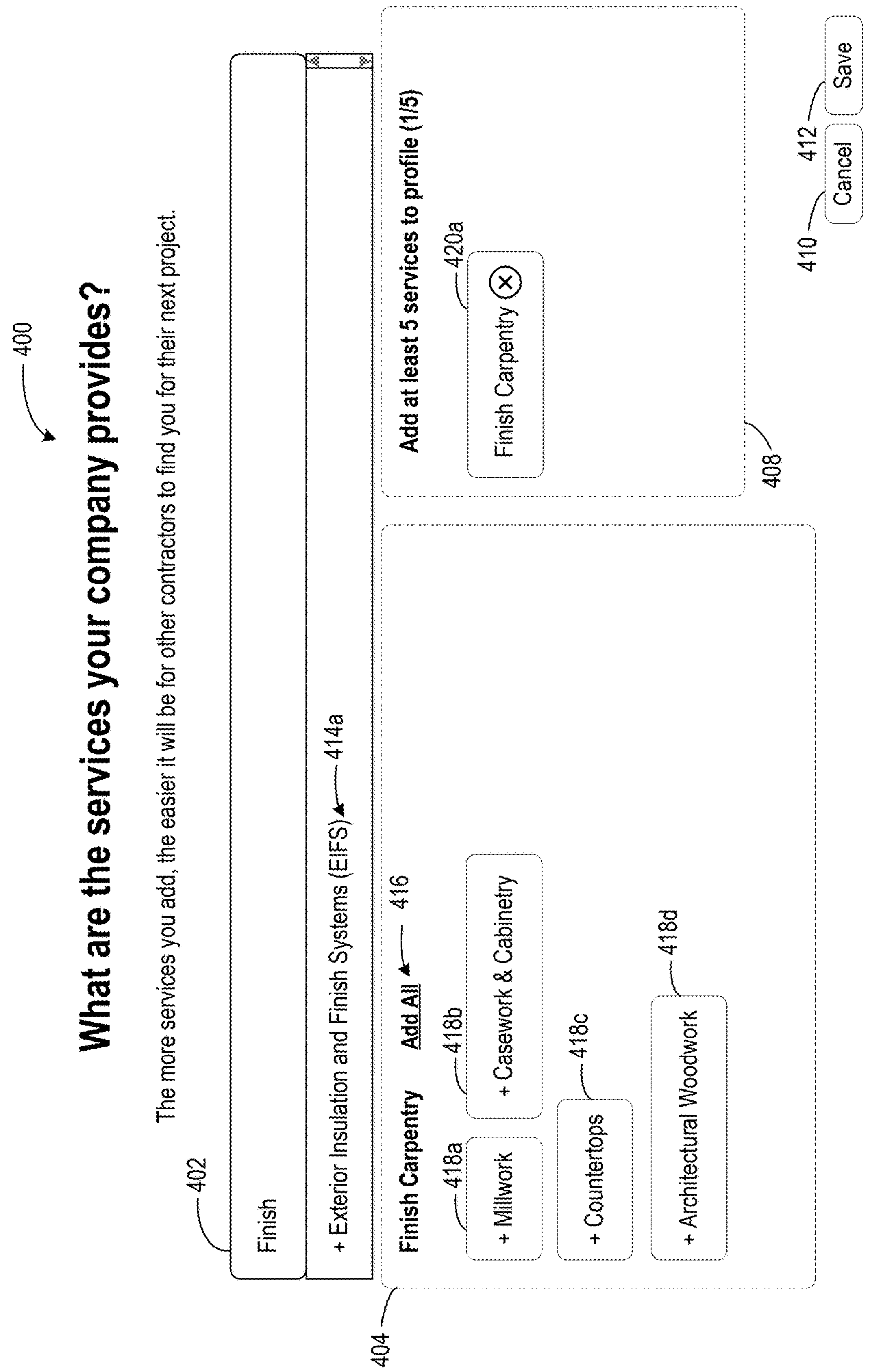
FIG. 4C depicts an example updated view of a GUI that may be presented to a user after a user selects a value from the search results presented using the disclosed software technology.

Returning to the illustrative example, FIG. 4C shows an updated example view 400 in which the user has selected search result 414*b*. In response to the user's selection of search result 414*b*, client station 112 has updated the example view 400 in a number of ways. First, search result 414*b* has been removed from search pane 402. Second, recommendation pane 404 has been updated to display (i) a new set of values 418*a*, 418*b*, 418*c*, and 418*d* that represent more granular versions of "Finish Carpentry," and (ii) a mass addition element 416 that, upon selection by the user, functions to add all of the new set of values 418*a*, 418*b*, 418*c*, and 418*d* to profile pane 408. Third, profile pane 408 has been updated to display selected value 420*a*, which as shown corresponds to "Finish Carpentry."

The construction professional may view profile pane 408 and decide to add additional values that are more granular than "Finish Carpentry." To accomplish this, the construction professional may either (i) utilize search pane 402 to search for and subsequently select another item, or (ii) select one or more of selectable values 418*a*, 418*b*, 418*c*, and/or 418*d* from within the updated recommendation pane 404. If the construction professional desires to select value 418*a*, the construction professional may select value 418*a* in one of the various ways indicated above. Conversely, if the construction professional choses to utilize search pane 402 by inputting a different string of characters, the user's client station may modify example view 400 in a similar fashion as the way described with respect to FIG. 4B.

Turning back to FIG. 3B, at block 322, the user may select a second value from the second set of values presented in the recommendation pane. The user may select the second value in various ways. As one possibility, the user may click the additional value within the search results via a peripheral device such as a mouse, keyboard, stylus, and/or touch screen. As another possibility, the user may provide a voice command to select the second value from the displayed search results. The user may select the second value in other ways as well.

At block 324, back-end platform 102 may add the selected second value to the given data field of the given data record. This function may be performed in various ways. As one possibility, back-end platform 102 may store the selected second value in the given data field of the given data record. As another possibility, back-end platform 102 may designate the selected second value to be stored in the given data field of the given data record at a future time once the user has finished selecting all values. Back-end platform 102 may assign the selected second value to the given data field of the given data record in other ways as well At block 326, client station 112 may, in response to receiving the user selection of the second value, may display an updated view of the GUI where the recommendation pane presents a third set of values from a third level of the hierarchical list. The third set of values may take various forms. In one example, the third set of values may be from a next lower level of the hierarchical list, where each value in the third set of values is a more granular version of the second value. However, in some scenarios, the second value may not have any related values in the next lower level of the hierarchical list. As such, in another example, the third set of values may be the same as the second set of values from which the second value was selected but with the second value removed from the set. The third set of values may take other forms as well.

Figure 4D:
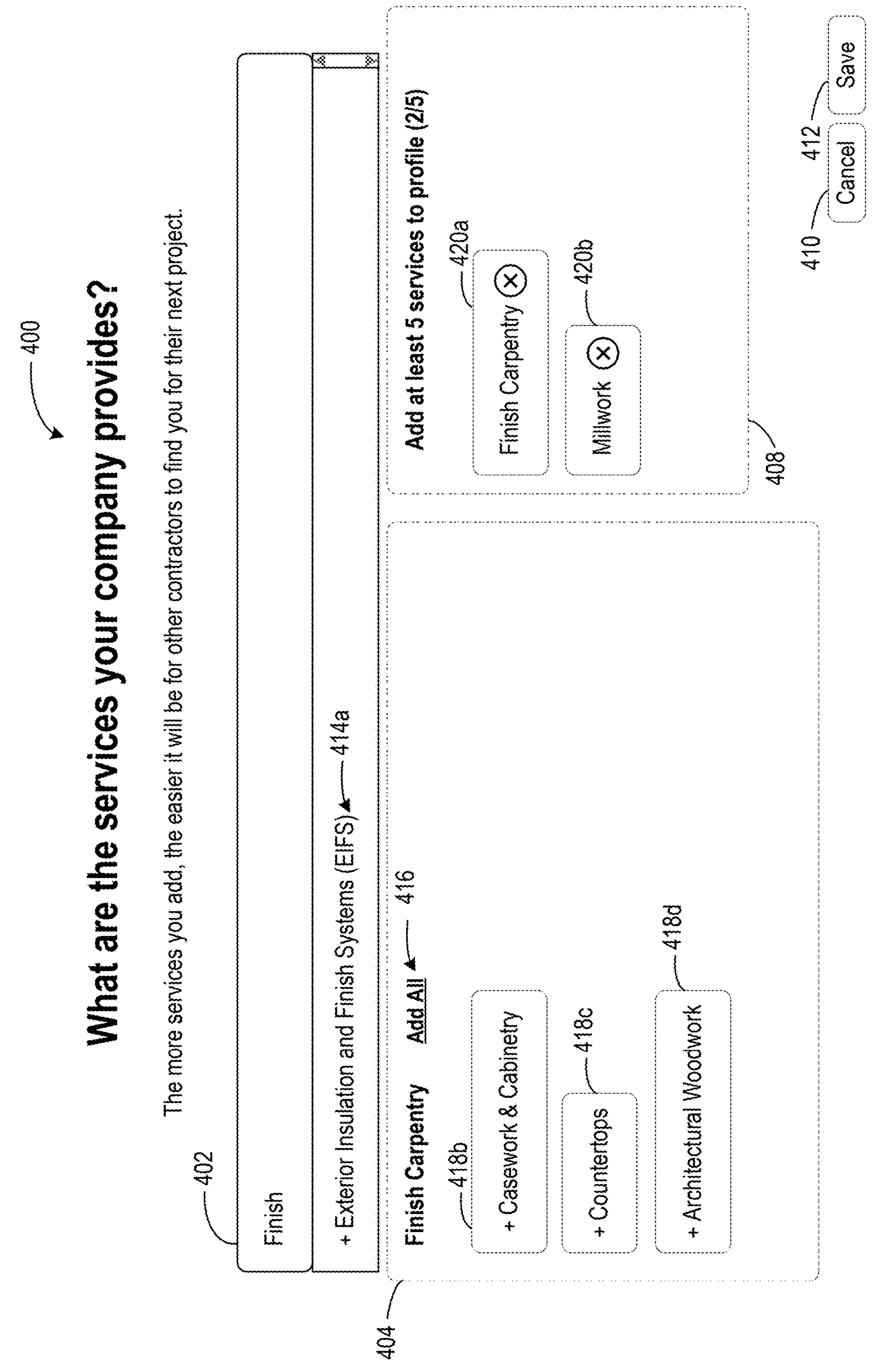
FIG. 4D depicts another example updated view of a GUI that may be presented to a user after a user selects an additional value from the set of more granular values presented in response to the user's first value selection using the disclosed software technology.

Turning back to the illustrative example, FIG. 4D shows a further updated example view 400 in which the user has selected value 418*a*, shown as "Millwork." In response to the user's selection of value 418*a*, the user's client station may update example view 400 in various ways. First, value 418*a* has been removed from recommendation pane 404. Second, profile pane 408 has been updated to display selected value 420*b*, which as shown corresponds to "Millwork." As shown, recommendation pane 404 has not been updated to display an updated set of values that are more granular versions of the selected value for "Millwork." As discussed above, this may have occurred because the value for "Millwork" had no related values in the hierarchical list that were more granular versions of the value "Millwork." In any event, once the user has selected value 418*a*, the user may decide to select an additional selectable value displayed in recommendation pane 404.

Turning back to FIG. 3B, at this stage in the disclosed software technology message flow, the user may desire to assign additional values to the given data field of the given data record. To accomplish this, the user may repeat one or more of the functions described in blocks 312, 316, or 322 until the user has assigned the desired amount of values to the given data field of the given data record and/or is satisfied with the level of granularity of the values assigned to the given data field of the given data record.

Figure 4E:
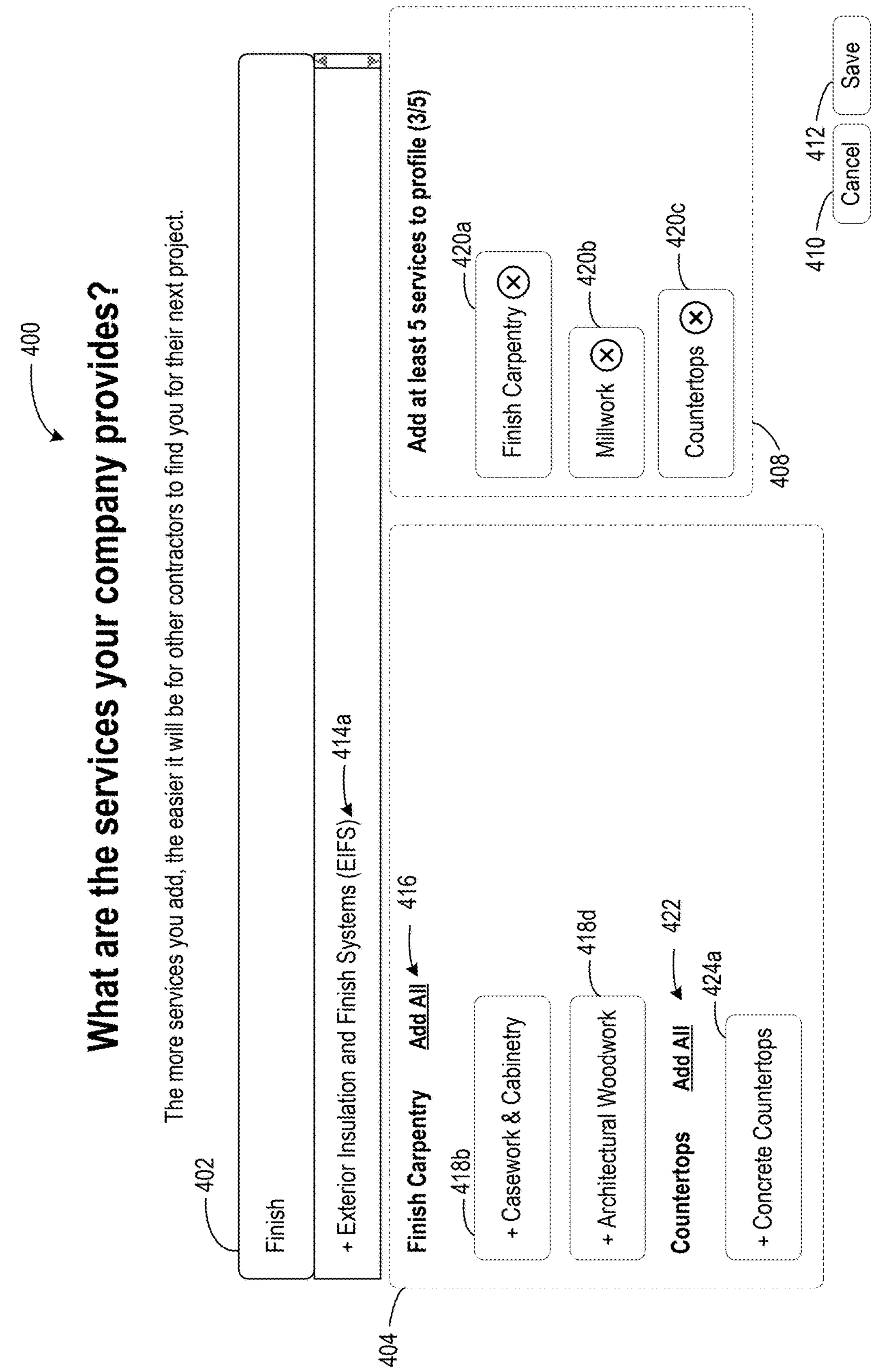
FIG. 4E depicts another example updated view of a GUI that may be presented to a user after a user selects yet another value from the set of more granular values presented in response to the user's first value selection using the disclosed software technology.

Turning back to the construction management platform example, FIG. 4E shows an updated example view 400 in which the user has decided to select yet another data for inclusion in the data field of the data record. As shown, the user has selected value 418*c*, labeled as "Countertops." In response to the user's selection of value 418*c*, client station 112 may update example view 400 in various ways. First, value 418*c* has been removed from recommendation pane 404. Second, profile pane 408 has been updated to display value 420*c*, which, similar to value 418*c*, represents "Countertops." Third, recommendation pane 404 has been updated to display (i) an updated set of values of which 424*a* is shown (others not shown) that represent more granular versions of the value "Countertops" in a next lower level of the hierarchical list, and (ii) a mass addition element 422 that, upon selection, is configured to assign all of the updated set of values, including value 424, to profile pane 408 and in turn cause the back-end computing platform to assign all of the updated set of values to the given data field of the given data record.

While the disclosed software technology is described above as incorporated into a SaaS application operating within a construction management platform. It should be understood that the disclosed software technology may be incorporated into a SaaS application operating within other software management platforms as well (e.g., healthcare, human resources, education, etc.). Further, the software technology may be incorporated into a native software application, a web application, or a cloud-based application.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A computing platform comprising:

at least one processor;

non-transitory computer-readable medium; and program instructions stored on the non-transitory computer-readable medium that, when executed by the at least one processor, cause the computing platform to:

cause a client station to display an initial view of a graphical user interface (GUI) for selecting, from a hierarchical list of possible values for a given data field of a data record, one or more values to assign to the given data field, wherein the initial view comprises a first set of selectable GUI elements representing a first set of values from a first level of the hierarchical list that are each available to be selected for assignment to the given data field;

receive, from the client station, an indication of a first user input entered via the initial view of the GUI, wherein the first user input comprises a selection of a first selectable GUI element representing a first value from the first set of values that is to be assigned to the given data field;

in response to receiving the first user input comprising the selection of the first selectable GUI element representing the first value that is to be assigned to the given data field:

based on the selection of the first selectable GUI element representing the first value that is to be assigned to the given data field, identify a second set of values from a second level of the hierarchical list that are each available to be selected for assignment to the given data field; and cause the client station to display a first updated view of the GUI that comprises (i) a second set of selectable GUI elements representing the second set of values, and (ii) an indication that the first value has been selected for assignment to the given data field;

receive, from the client station, an indication of a second user input entered via the first updated view of the GUI, wherein the second user input comprises a selection of a second selectable GUI element representing a second value from the second set of values that is to be assigned to the given data field in addition to the first value;

in response to receiving the second user input comprising the selection of the second selectable GUI element representing the second value that is to be assigned to the given data field:

cause the client station to display a second updated view of the GUI that comprises an updated indication that both the first value and the second value have been selected for assignment to the given data field; and after receiving at least the first and the second user inputs, store data to indicate assignment of both the first value and the second value to the given data field of the data record.

2. The computing platform of claim 1, wherein the computing platform further comprises program instructions stored on the non-transitory computer-readable medium that, when executed by the at least one processor, cause the computing platform to:

based on the selection of the second selectable GUI element representing the second value that is to be assigned to the given data field, identify a third set of values from a third level of the hierarchical list that are each available to be selected for assignment to the given data field, wherein the second updated view of the GUI further comprises a third set of selectable GUI elements representing the third set of values.

3. The computing platform of claim 1, wherein the second updated view of the GUI further comprises an updated second set of selectable GUI elements that no longer includes the second selectable GUI element representing the second value.

4. The computing platform of claim 1, wherein the computing platform further comprises program instructions stored on the non-transitory computer-readable medium that, when executed by the at least one processor, cause the computing platform to:

receive, from the client station, an indication of a third user input entered via the second updated view of the GUI, wherein the third user input comprises a search for values within the hierarchical list;

based on the third user input, cause the client station to display a third updated view of the GUI that comprises a third set of selectable GUI elements representing a third set of values from the hierarchical list;

receive, from the client station, an indication of a fourth user input entered via the third updated view of the GUI, wherein the fourth user input comprises a selection of a third selectable GUI element representing a third value from the third set of values; and store data to indicate assignment of the third value to the given data field of the data record.

5. The computing platform of claim 4, wherein the first and second set of selectable GUI elements are presented via a recommendation pane of the GUI, and wherein the third set of selectable GUI elements is presented via a search pane of the GUI.

6. The computing platform of claim 1, wherein the indication that the first value has been selected for assignment to the given data field and the updated indication that both the first value and the second value have been selected for assignment to the given data field are presented via a selection pane that indicates each value selected for assignment to the given data field.

7. The computing platform of claim 1, wherein the computing platform further comprises program instructions stored on the non-transitory computer-readable medium that, when executed by the at least one processor, cause the computing platform to:

after receiving the second user input, determine that the second value is not related to any value from a third level of the hierarchical list, wherein the second updated view of the GUI comprises an updated second set of selectable GUI elements that no longer includes the second value.

8. The computing platform of claim 1, further comprising program instructions stored on the non-transitory computer-readable medium that, when executed by the at least one processor, cause the computing platform to:

before storing data to indicate assignment of both the first value and the second value to the given data field of the data record, receive, from the client station, an indication of a third user input entered via either the second updated view of the GUI or a subsequent updated view of the GUI, wherein the third user input comprises a request to save each value that is selected for assignment to the given data field as a stored value of the given data field.

9. The computing platform of claim 1, wherein the first set of values comprises less than all possible values included in the first level of the hierarchical list, and wherein the second set of values comprises less than all possible values included in the second level of the hierarchical list.

10. The computing platform of claim 1, further comprising program instructions stored on the non-transitory computer-readable medium that, when executed by the at least one processor, cause the computing platform to:

before causing the client station to display the initial view of the GUI, identify the first set of values based on historical data indicating one or more frequently-selected values from the first level of the hierarchical list.

11. The computing platform of claim 1, further comprising program instructions stored on the non-transitory computer-readable medium that, when executed by the at least one processor, cause the computing platform to:

before causing the client station to display the initial view of the GUI, receive a request to either (i) create the data record, or (ii) update the given data field of the data record.

12. A non-transitory computer-readable medium, wherein the non-transitory computer-readable medium is provisioned with program instructions that, when executed by at least one processor, cause a computing platform to:

cause a client station to display an initial view of a graphical user interface (GUI) for selecting, from a hierarchical list of possible values for a given data field of a data record, one or more values to assign to the given data field, wherein the initial view comprises a first set of selectable GUI elements representing a first set of values from a first level of the hierarchical list that are each available to be selected for assignment to the given data field;

receive, from the client station, an indication of a first user input entered via the initial view of the GUI, wherein the first user input comprises a selection of a first selectable GUI element representing a first value from the first set of values that is to be assigned to the given data field;

in response to receiving the first user input comprising the selection of the first selectable GUI element representing the first value that is to be assigned to the given data field:

based on the selection of the first selectable GUI element representing the first value that is to be assigned to the given data field, identify a second set of values from a second level of the hierarchical list that are each available to be selected for assignment to the given data field; and cause the client station to display a first updated view of the GUI that comprises (i) a second set of selectable GUI elements representing the second set of values, and (ii) an indication that the first value has been selected for assignment to the given data field;

receive, from the client station, an indication of a second user input entered via the first updated view of the GUI, wherein the second user input comprises a selection of a second selectable GUI element representing a second value from the second set of values that is to be assigned to the given data field in addition to the first value;

in response to receiving the second user input comprising the selection of the second selectable GUI element representing the second value that is to be assigned to the given data field:

cause the client station to display a second updated view of the GUI that comprises an updated indication that both the first value and the second value have been selected for assignment to the given data field; and after receiving at least the first and the second user inputs, store data to indicate assignment of both the first value and the second value to the given data field of the data record.

13. The non-transitory computer-readable medium of claim 12, wherein the non-transitory computer-readable medium is also provisioned with program instructions that, when executed by the at least one processor, cause the computing platform to:

based on the selection of the second selectable GUI element representing the second value that is to be assigned to the given data field, identify a third set of values from a third level of the hierarchical list that are each available to be selected for assignment to the given data field, wherein the second updated view of the GUI further comprises a third set of selectable GUI elements representing the third set of values.

14. The non-transitory computer-readable medium of claim 12, wherein the second updated view of the GUI further comprises an updated second set of selectable GUI elements that no longer includes the second selectable GUI element representing the second value.

15. The non-transitory computer-readable medium of claim 12, wherein the non-transitory computer-readable medium is also provisioned with program instructions that, when executed by the at least one processor, cause the computing platform to:

receive, from the client station, an indication of a third user input entered via the second updated view of the GUI, wherein the third user input comprises a search for values within the hierarchical list;

based on the third user input, cause the client station to display a third updated view of the GUI that comprises a third set of selectable GUI elements representing a third set of values from the hierarchical list;

receive, from the client station, an indication of a fourth user input entered via the third updated view of the GUI, wherein the fourth user input comprises a selection of a third selectable GUI element representing a third value from the third set of values; and store data to indicate assignment of the third value to the given data field of the data record.

16. The non-transitory computer-readable medium of claim 15, wherein the first and second set of selectable GUI elements are presented via a recommendation pane of the GUI, and wherein the third set of selectable GUI elements is presented via a search pane of the GUI.

17. The non-transitory computer-readable medium of claim 12, wherein the indication that the first value has been selected for assignment to the given data field and the updated indication that both the first value and the second value have been selected for assignment to the given data field are presented via a selection pane that indicates each value selected for assignment to the given data field.

18. The non-transitory computer-readable medium of claim 12, wherein the first set of values comprises less than all possible values included in the first level of the hierarchical list, and wherein the second set of values comprises less than all possible values included in the second level of the hierarchical list.

19. The non-transitory computer-readable medium of claim 12, wherein the non-transitory computer-readable medium is also provisioned with program instructions that, when executed by the at least one processor, cause the computing platform to:

before causing the client station to display the initial view of the GUI, identify the first set of values based on historical data indicating one or more frequently-selected values from the first level of the hierarchical list.

20. A method carried out by a computing platform, the method comprising:

causing a client station to display an initial view of a graphical user interface (GUI) for selecting, from a hierarchical list of possible values for a given data field of a data record, one or more values to assign to the given data field, wherein the initial view comprises a first set of selectable GUI elements representing a first set of values from a first level of the hierarchical list that are each available to be selected for assignment to the given data field;

receiving, from the client station, an indication of a first user input entered via the initial view of the GUI, wherein the first user input comprises a selection of a first selectable GUI element representing a first value from the first set of values that is to be assigned to the given data field;

in response to receiving the first user input comprising the selection of the first selectable GUI element representing the first value that is to be assigned to the given data field:

based on the selection of the first selectable GUI element representing the first value that is to be assigned to the given data field, identifying a second set of values from a second level of the hierarchical list that are each available to be selected for assignment to the given data field; and causing the client station to display a first updated view of the GUI that comprises (i) a second set of selectable GUI elements representing the second set of values, and (ii) an indication that the first value has been selected for assignment to the given data field;

receiving, from the client station, an indication of a second user input entered via the first updated view of the GUI, wherein the second user input comprises a selection of a second selectable GUI element representing a second value from the second set of values that is to be assigned to the given data field in addition to the first value;

in response to receiving the second user input comprising the selection of the second selectable GUI element representing the second value that is to be assigned to the given data field:

causing the client station to display a second updated view of the GUI that comprises an updated indication that both the first value and the second value have been selected for assignment to the given data field; and after receiving at least the first and the second user inputs, storing data to indicate assignment of both the first value and the second value to the given data field of the data record.

* * * * *